US008671617B2

(12) United States Patent  (10) Patent No.: US 8,671,617 B2
Prohaska  (45) Date of Patent: Mar. 18, 2014

(54) CONTINUOUS LOOP PLANT GROWING SYSTEM

(76) Inventor: James B. Prohaska, Prior Lake, MN (US)

(*) Notice: Subject to any disclaimer, the term of this patent is extended or adjusted under 35 U.S.C. 154(b) by 125 days.

(21) Appl. No.: 12/734,738

(22) PCT Filed: Nov. 18, 2008

(86) PCT No.: PCT/US2008/012881
§ 371 (c)(1),
(2), (4) Date: May 20, 2010

(87) PCT Pub. No.: WO2009/067194
PCT Pub. Date: May 28, 2009

(65) Prior Publication Data
US 2010/0269407 A1  Oct. 28, 2010

Related U.S. Application Data

(60) Provisional application No. 61/003,902, filed on Nov. 21, 2007.

(51) Int. Cl.
*A01G 9/00* (2006.01)
*A01G 31/04* (2006.01)
(52) U.S. Cl.
USPC .............................. 47/66.6; 47/65.5; 47/62 C
(58) Field of Classification Search
USPC ............... 47/59 R, 62 R, 62 C, 18, 65.5, 66.6
See application file for complete search history.

(56) References Cited

U.S. PATENT DOCUMENTS

| 4,258,501 | A | * | 3/1981 | Brown ............................... 47/16 |
| 4,278,625 | A | * | 7/1981 | Dedolph ........................ 264/39 |
| 4,422,990 | A | * | 12/1983 | Armstrong et al. .......... 264/45.3 |
| 4,505,068 | A | | 3/1985 | Kaneko |
| 4,951,415 | A | * | 8/1990 | Kawarabayashi et al. ........ 47/60 |
| 6,508,033 | B2 | | 1/2003 | Hessel et al. |
| 6,840,007 | B2 | * | 1/2005 | Leduc et al. ................... 47/62 C |
| 2006/0162252 | A1 | * | 7/2006 | Lim .............................. 47/59 R |

FOREIGN PATENT DOCUMENTS

| JP | 6-075130 U | 10/1994 |
| JP | 11318214 A | 11/1994 |
| JP | 08033434 A * | 2/1996 ............. A01G 31/06 |
| JP | 2001095383 A | 4/2001 |
| KR | 890004529 B1 | 11/1989 |
| KR | 10-0195969 B1 | 6/1999 |

OTHER PUBLICATIONS

Machine translation of JP 08033434 to Murai, published Feb. 6, 1996.*
Machine translation of JP 2001095383 to Uchiyama, published Apr. 10, 2001 (foreign patent cited on PTO-1449 dated Aug. 3, 2010).*
International Search Report and Written Opinion in counterpart foreign Application No. PCT/US2008/012881, filed Nov. 18, 2008.

* cited by examiner

*Primary Examiner* — Son T Nguyen
*Assistant Examiner* — Kathleen Alker
(74) *Attorney, Agent, or Firm* — Kinney & Lange, P.A.

(57) ABSTRACT

A continuous loop plant growing system includes a channel having a moving floor, a growing medium contained in the channel, at least one plant, at least one light, and at least one chopper. The moving floor transports the growing medium around a continuous loop dividable into a planting zone, a growing zone, a harvesting zone, and a decomposing zone.

16 Claims, 4 Drawing Sheets

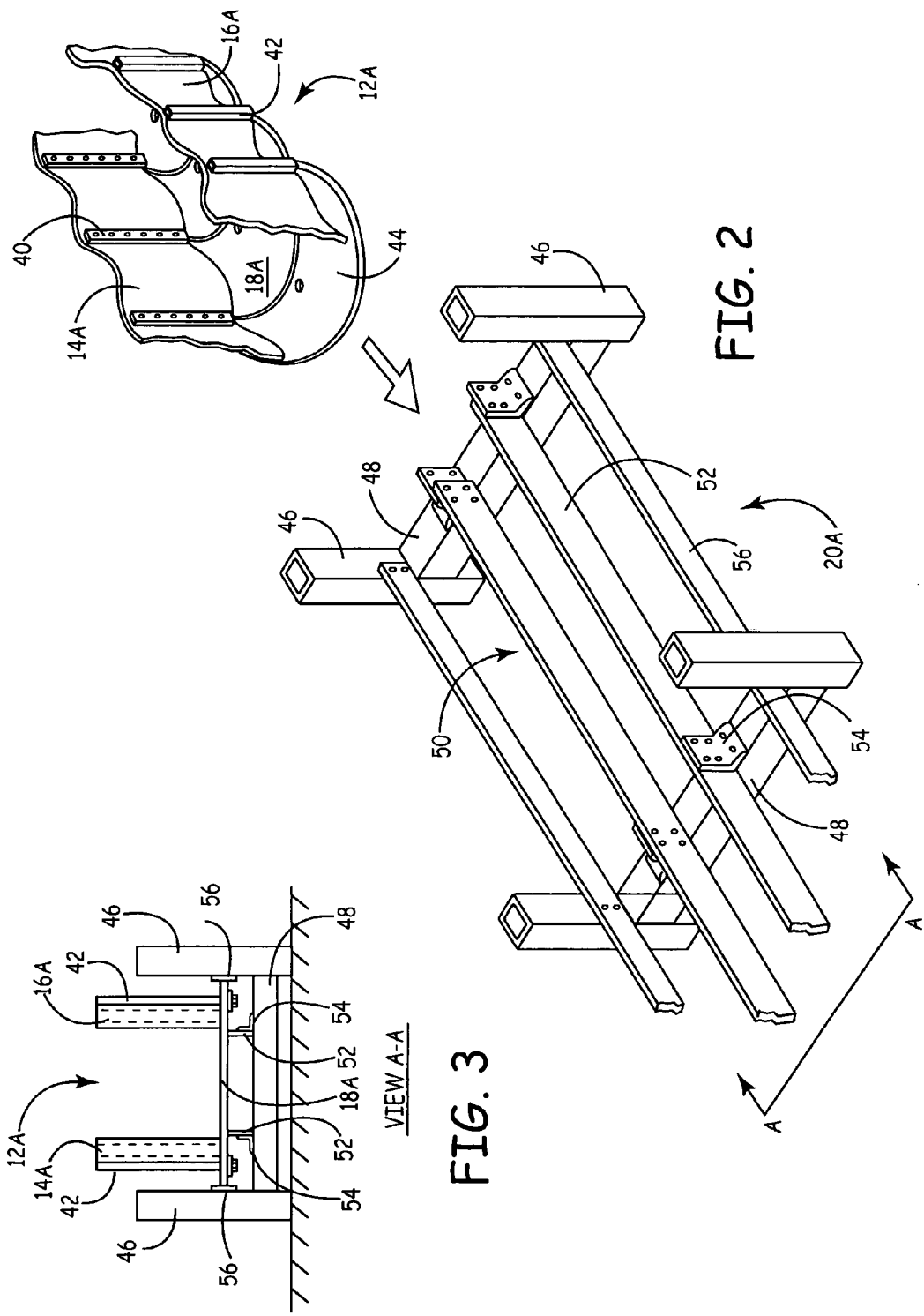

VIEW B-B

CONTINUOUS LOOP PLANT GROWING SYSTEM

BACKGROUND

The present invention relates to growing plants. More particularly, the present invention relates to a method and apparatus for growing plants indoors.

It is well known that plants are part of a healthy diet. Of all the plants, fruits and vegetables are particularly touted as important for optimum health. Dietary research suggests that fruits and vegetables should represent a substantial portion of daily caloric intake. There are many reasons that people do not ingest enough fruits and vegetables including short self life, taste, and cost.

Plant growth is highly dependant on the surrounding environment. Since the environment on Earth is often unpredictable and unfavorable, plants have long been grown indoors. Indoor plant growing operations exist in all sizes from individual family greenhouses to large plant factories. Regardless of size, growing plants indoors usually entails planting seeds in pots filled with soil and nurturing the potted seeds with water and light as they mature into plants. Mature plants may then be sold, consumed, or transplanted outdoors.

Modern technology has increased the feasibility of growing plants indoors year round. Lamps that replicate sunlight are an essential tool for any indoor gardener and come in many different types including incandescent, fluorescent, metal halide, and high pressure sodium to name a few. Improvements in temperature and humidity controls have also benefited the indoor gardener. The ability to monitor and alter indoor climate with the touch of a digital thermostat can greatly improve the propagation of an indoor plant. Despite modern tools, a very small percentage of the food supply is grown indoors.

SUMMARY

One embodiment of the present invention is a growing system including a channel, a growing medium, at least one plant, at least one light, and at least one chopper. The channel has an inner wall, an outer wall, and a moving floor forming a continuous loop dividable into a planting zone, a growing zone, a harvesting zone, and a decomposing zone. The growing medium is contained in the channel and moves along with the channel floor. The plant is located in the growing medium and is being transported therewith. The light is fixed above the channel for supplying light to the plant as it moves through the growing zone. The chopper is fixed above the channel for chopping up the plant as it moves through the decomposing zone.

Another embodiment of the present invention is a growing apparatus. The growing apparatus includes a channel having a moving floor, which forms a continuous loop. The growing apparatus also includes least one light fixed above the channel for supplying light and at least one chopper fixed above the channel.

BRIEF DESCRIPTION OF THE DRAWINGS

FIG. 2 is an exploded view of one embodiment of a channel and a support structure.

FIG. 3 is a cross section of the support structure accommodating the channel from FIG. 2.

DETAILED DESCRIPTION

One embodiment of the present invention is a continuous loop growing system suitable for growing plants indoors. Short and/or difficult growing seasons can be circumvented by use of the continuous loop growing system. In this system, seeds are planted in a growing medium located in a channel having a moving floor. The seeds germinate and emerge from the growing medium as plants, which are nurtured with light and water. When mature, plant products are harvested and leftover plant residue is chopped up to be recycled as fertilizer. The channel is long enough to host at least one plant life cycle, from seed planting through decomposition, as the growing medium is transported around the continuous loop. The details and advantages of the continuous loop growing system are disclosed below.

Figure 1:
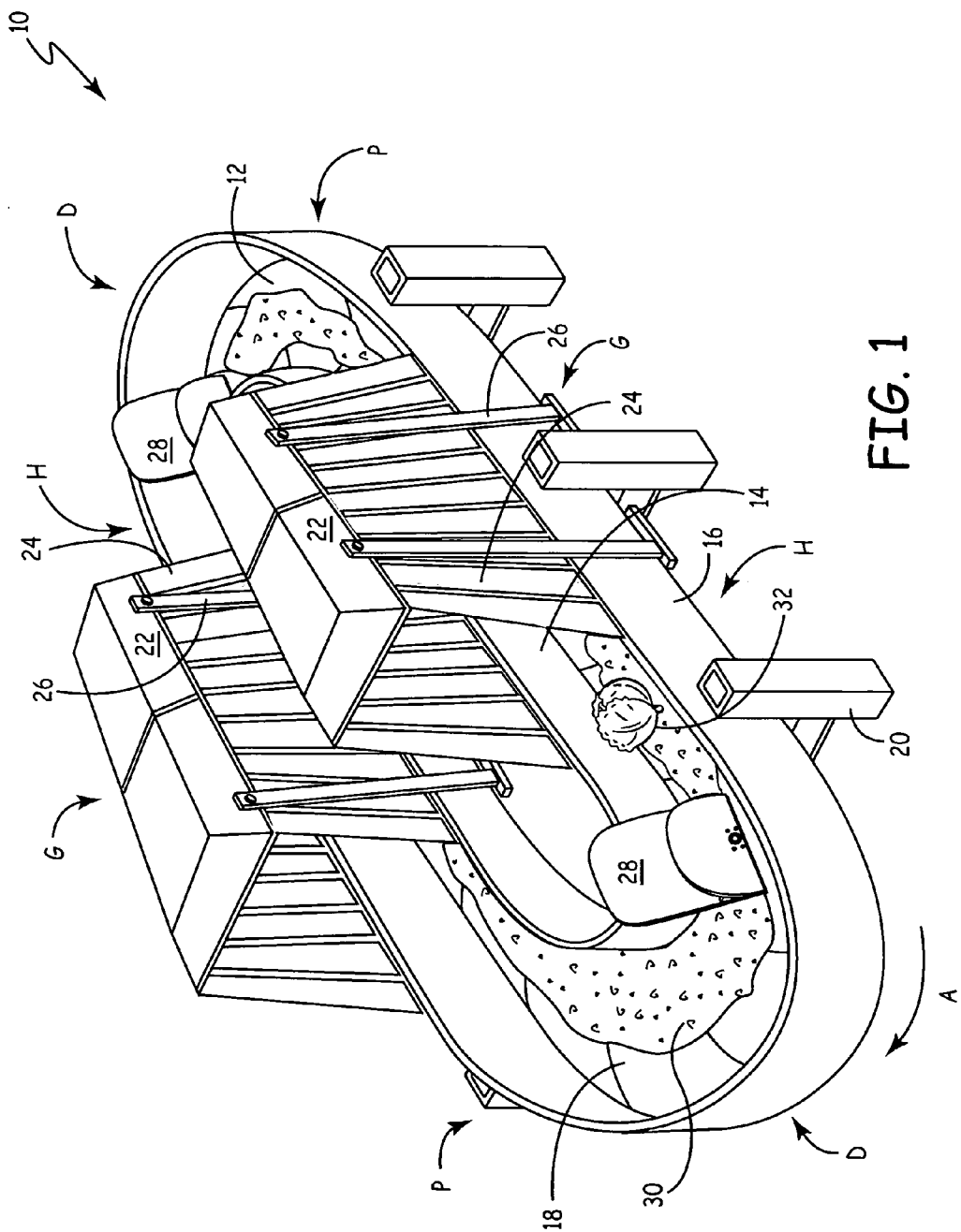
FIG. 1 is a perspective view of one embodiment of a continuous loop growing system in accordance with the present invention.

FIG. 1 is a perspective view of one embodiment of continuous loop growing system 10 where one loop of channel 12 represents two plant life cycles. Channel 12 has inner wall 14, outer wall 16, and floor 18 supported by support structure 20. Also visible in FIG. 1 are lights 22 having flaps 24 and supports 26, as well as choppers 28, growing medium 30, and plant 32.

Channel 12 has two upstanding side walls, inner wall 14 and outer wall 16 for containing growing medium 30, such as soil, within channel 12. Inner wall 14 is continuous such that it forms an inner loop defining an inside edge of channel 12. Similarly, outer wall 16 is continuous such that it forms an outer loop defining an outside edge of channel 12. Located between inner wall 14 and outer wall 16 is floor 18. Together inner wall 14, outer wall 16, and floor 18 form an oval-shaped continuous channel 12. Floor 18 is sectioned such that it can move slowly in direction A, much like a luggage conveyor at an airport. In the illustrated embodiment, inner wall 14 and outer wall 16 are attached to floor 18 so that, entire channel 12 moves in direction A. In alternative embodiments, inner wall 14 and outer wall 16 are stationary while only floor 18 moves in direction A. Because channel 12 hosts growing medium 30, which is likely to be moist, it is beneficial to construct channel 12 out of a material that is resistant to corrosion. If inner wall 14 and outer wall 16 move along with floor 18, then a flexible material capable of traversing curves can be used. An exemplary material for construction channel 12 is plastic. Channel 12 is supported by support structure 20, which will be explained in detail with reference to FIGS. 2 and 3.

Lights 22 are stationary elements located above channel 12 and provide light for nurturing seeds and plants located in the growing medium. There may be a single light 22 or there may be two or more sets of lights 22, as depicted in FIG. 1. If there is more than one light 22, lights 22 may be programmed to provide different wavelengths of light known in the art to nurture different aspects of plant growth. For example, a first light 22 could emit a wavelength known to benefit seeds as they first sprout into plants, and a second light 22 could emit a different wavelength known to benefit a more mature plant as it develops a plant product, such as fruit, vegetables, and the like. Lights 22 can be programmed to provide continuous light, or lights 22 can rotate through light/dark cycles. Lights 22 can be any commercially available lamp that emits light for plant growth such as, but not limited to, incandescent, fluorescent, metal halide, and high pressure sodium lamps. Flaps 24 are attached to lights 22 and have reflective inner surfaces for reflecting light produced by lights 22. In the depicted embodiment, flaps 24 hang from lights 22 in two rows, a first row hanging into a space between inner wall 14 and lights 22 and a second row hanging into a space between outer wall 16 and lights 22. Flaps 24 do not produce a rigid wall and thus, it is possible to reach through reflective flaps 24 to access channel 12 underneath grow lights 22 for watering or the like. Lights 22 are suspended above channel 12 by supports 26 that extend downwards and attach to support structure 20.

Choppers 28 are also stationary elements located above channel 10 and can be suspended by supports (not shown) similar to supports 26. Rotary plant choppers having cutting blades and safety shields are depicted as choppers 28 in FIG. 1, but choppers 28 can be any type of commercially available equipment for mechanically breaking down plant matter. Floor 18, choppers 28, and lights 22 are all electrically connected to a power source such as a motor (not shown). The power source can be driven by a conventional electrical grid, but in preferred embodiments, system 10 runs on electricity generated from renewable sources of energy such as solar, wind, manure, etc.

A plant life cycle is dividable into four zones, which are labeled in FIG. 1 as zone P (for planting), zone G (for growing), zone H (for harvesting), and zone D (for decomposing). Plant life begins when seeds are planted into growing medium 30 while it is located in planting zone P. Seeds may be planted automatically by a machine or manually by human workers. As floor 18 slowly moves in direction A, growing medium 30 containing the seeds are also moving along continuous loop 10. The planted seeds germinate and begin to emerge from growing medium 30 as plants. Emerging plants are nurtured in growing zone G by light emanating from lights 22 and reflecting off flaps 24. Also in growing zone G, plants can be given water and other nutrients to encourage growth. Commercially available watering systems can be used in the growing zone G. Also, plant nutrients can be mixed with water and dispersed through the watering system as known in the art. As discussed above, lights 22 can be programmed to provide one or more particular kinds of light beneficial to plant growth. As growing medium 30 reaches the end of growing zone G, plants are fully grown, mature, and producing one or more plant products. Exemplary products include, but are not limited to, fruits, vegetables, and grains. Plants enter harvesting zone H where the plant product is harvested. Exemplary plant 32 is shown in zone H. Harvesting may occur automatically by machines or manually by human workers. Any plant material that is not harvested as product can be left in channel 12 as plant residue. Once the entire product is harvested, growing medium 30 enters decomposing zone D where the plant residue is broken down by choppers 28. The broken down plant residue can be left on top of growing medium 30 or mixed into growing medium 30 to encourage decomposition. Earthworms and/or microbes can be located in growing medium 30 of decomposing zone D for converting plant residue into fertilizer. After decomposing zone D, growing medium 30 enters planting zone P, where a new plant life cycle can begin such that continuous loop growing system 10 has no end.

In the illustrated embodiment, continuous loop growing system 10 accommodates two complete lifecycles (zone P, zone G, zone H, zone D, zone P, zone G, zone H, zone D) in one loop of channel 12. It is possible to use a single lifecycle for one loop of channel 12 or many lifecycles for one loop of channel 12, according to the amount of plants desired and the space provided. For example, a family greenhouse may only need a single life cycle system containing one zone P one zone G, one zone H, and one zone D. A community, however, may need a many lifecycle system that could, for example, wrap around an inside perimeter of a large building.

The speed with which floor 18 moves in direction A, thereby carrying the growing medium through zone P, zone G, zone H, and zone D, is dependent on the species of plant being grown. It is contemplated that some species of plants will respond to continuous light from lights 22 and demonstrate an accelerated life cycle of several weeks. Other plant species may require light-dark cycles from lights 22 and demonstrate a slower life cycle of several months. Controls are provided to adjust the speed of floor 18.

FIG. 2 is an exploded view and FIG. 3 is a cross section taken on line A-A showing how one embodiment of support structure 20A accommodates channel 12A. Channel 12A includes inner wall 14A showing backing strips 40, outer wall 16A showing support tubes 42, and floor 18A having segments 44. Support structure 20A includes legs 46, cross supports 48, track 50 having slide rails 52 and L-brackets 54, and bumpers 56.

Channel 12A is similar to channel 12 described above and has inner wall 14A and outer wall 16A extending upwards from either side of floor 18A. Floor 18A is segmented 44 in order to traverse curves located in a continuous loop. On the inside surface of both inner wall 14A and outer wall 16A are inside backing strips 40, repeated at regular intervals. On the outside surface of both inner wall 14A and outer wall 16A are support tubes 42, repeated at regular intervals. Backing strips 40 and support tubes 42 can be repeated at the same regular interval such that they are at the same location but on the inside surface of a wall and the outside surface of a wall, respectively. The details of inner wall 14A, outer wall 16A, floor 18A, backing strips 40, support tubes 42, and segments 44 are discussed below with reference to FIGS. 4-6.

Support structure 20A has vertically extending legs 46 connected by horizontally extending cross supports 48. Legs 46 are rigid and hollow such that they are capable of being stacked vertically. For example, a first continuous growing system can be placed on the floor, and a second continuous growing system can be placed on top of the first continuous growing system, and so on. Suitable materials for support structure 20A include, but are not limited to, steel, aluminum, plastic, and wood. Attached to a top surface of cross supports 48 are slide rails 52 reinforced by L-brackets. In the illustrated embodiment, there are two upstanding slide rails 52, which define a bottom of track 50. Channel 12A is received by slide rails 52, which transfer the weight of channel 12A to support structure 20A. Slide rails 52 are strong enough to vertically support the weight of channel 12A while also being laterally flexible to accommodate curves in the continuous loop. Top surfaces of slide rails 52 provide a low friction contact for floor 18A to move along. If friction is too great, then rollers can be added to the bottom of floor 18A. The structural integrity of track 50 is ensured by L-brackets 54, but more lateral, longitudinal, and/or vertical support can be added to support structure 20A if needed. Attached to legs 46 are bumpers 56, which define sides of track 50. Bumpers 56 extend in between and attach to legs 46 in order to form a low friction, continuous guide rail for channel 12A. As can be seen in FIG. 3, bumpers 56 contact and guide the outermost and the innermost sides of floor 18A throughout the continuous loop.

Figure 4:
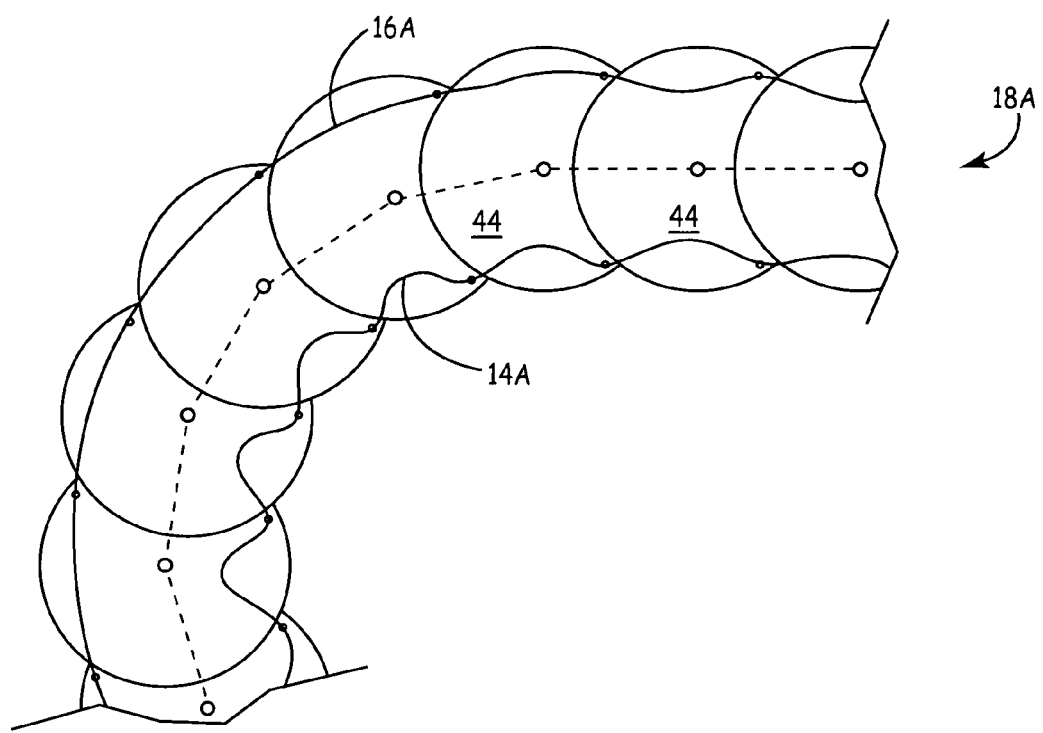
FIG. 4 is a top view of the channel from FIGS. 2 and 3 traversing a curve.

FIG. 4 is a top view of channel 12A from FIGS. 2 and 3 traversing a curve of the continuous loop. Channel 12A includes inner wall 14A and outer wall 16A attached to floor 18A. In the illustrated embodiment, floor 18A has arc-shaped segments 44 that mate together. Segments 44 are configured to rotatably translate relative to other segments 44 as floor 18A moves through a curve, as depicted in FIG. 4. The space that allows segments 44 to translate relative to one another may be sealed. Sealing floor 18A will ensure that the growing medium located within channel 12A does not leak out.

Inner wall 14A and outer wall 16A have a wavy appearance and thus, seem to be constructed with excess material. As depicted in FIG. 4, the seemingly excess material is necessary to accommodate a curving continuous loop. When traversing a curve, the seemingly excess material of outer wall 16A is pulled straight. Precisely the opposite is true of inner wall 14A where the seemingly excess wall material buckles inwards toward outer wall 16A. This inward movement of inner wall 14A causes fractures within the growing medium, which then fill with air and aid plant growth. Inner wall 14A, outer wall 16A, and segments 44 are constructed from flexible impervious material such as, but not limited to, conventional conveyor belting having a sealed surface.

Figure 5:
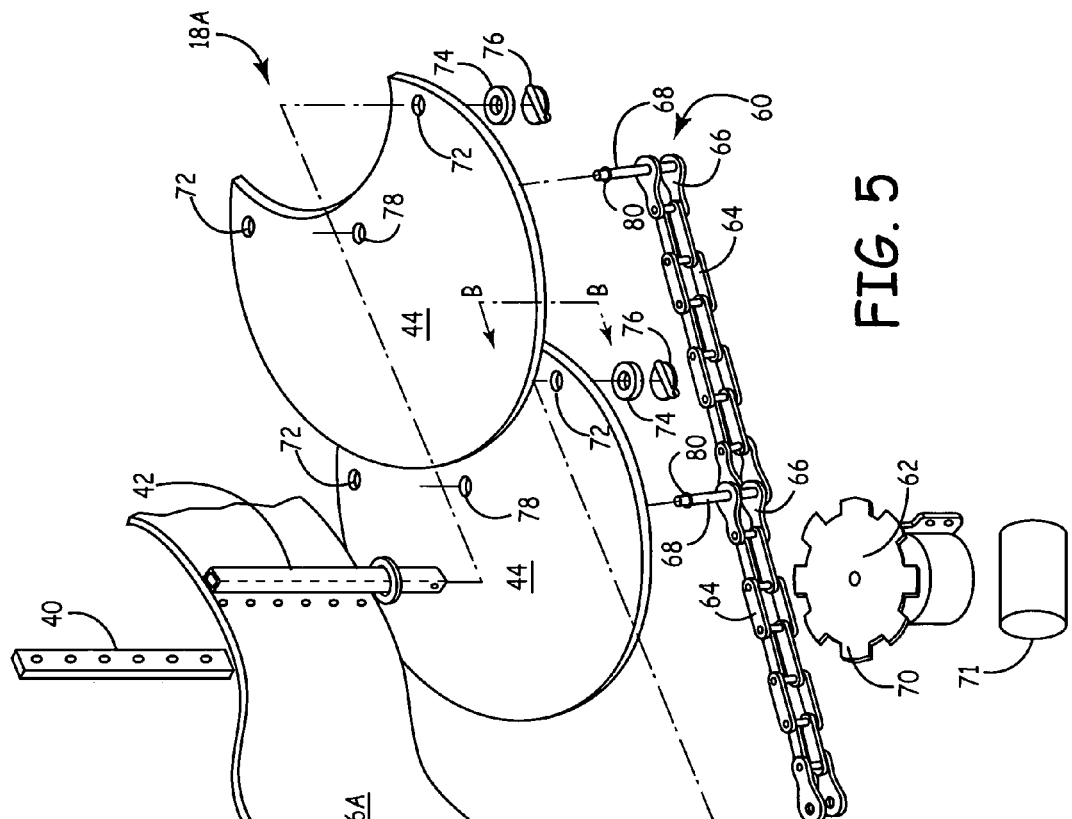
FIG. 5 is an exploded view of an outer wall, floor, chain, and drive sprocket.

FIG. 5 is an exploded view showing outer wall 16A, floor 18A, chain 60, and drive sprocket 62 interacting. Outer wall 16A is located between backing strips 40 and support tubes 42, which are attached to outer wall 16A with screw 41. Support tubes 42 connect segments 44 of floor 18A to chain 60, which has regular links 64, connecting links 66, and pivot pins 68. Beside chain 60 is drive sprocket 62 having teeth 70 for engaging chain 60, thereby moving floor 18A.

Figure 6:
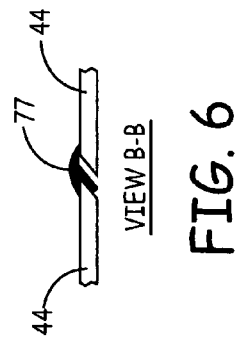
FIG. 6 is a cross section of the floor from FIG. 5.

Located at regular intervals along both inner wall 14A (not shown) and outer wall are backing strips 40 and support tubes 42. Support tubes 42 contact outer surfaces of both inner wall 14A and outer wall 16A, while backing strips 40 contact inner surfaces of both inner wall 14A and outer wall 16A. Backing strips 40 and support tubes 42 are attached to inner wall 14A and outer wall 16A with self tapping screws 41 or any other suitable fastening means. A bottom portion of each support tube 42 inserts into holes 72 located in segments 44 of floor 18A. Support tubes 42 are secured into holes 72 by washer 74 and spring retention pin 76, or any other suitable fastening means. Connecting outer wall 16A to segments 44 in this manner retains the growing medium within the channel, but also allows outer wall 16A to slide along segment 44 as floor 18A transverses a curve. In order to make the channel more water-tight, seal 77 can be attached to one or more segments 44. FIG. 6, a cross section taken on line B-B, depicts how seal 77 can fill a space in between two segments 44 of floor 18A.

Chain 60 is laterally flexible and has at least two types of links: normal links 64 and connecting links 66. The majority of chain 60 comprises normal links 64, but at regular intervals a connecting link 66 is located between normal links 62. Each connecting link 64 has a central hole for receiving pivot pin 68. Pivot pin 68 extends through the hole in connecting link 64 and continues upwards to mate with hole 78 located in segment 44. Pivot pin 68 is secured to segment 44 with spring clip 80, which expands into an annular groove disposed in hole 78. Pivot pins 68 connect chain 60 to segments 44 and segments 44 to each other, while allowing segments 44 and connecting links 66 to rotate relative to pivot pins 68. Use of pivot pin 68 and spring clip 80, however, are exemplary and any other suitable fastening means can be used.

Teeth 70 on drive sprocket 62 rotate and engage both normal links 64 and connecting links 66 of chain thereby moving floor 18A. In order for drive sprocket 62 to seamlessly engage chain 60, the spacing between normal link 64 and connecting links 66 should be similar if not the same. Drive sprocket 62 can be fixed to a shaft of electric motor 71 or an output shaft of a speed reducer gearbox located between drive sprocket 62 and electric motor 71. Electric motor 71 provides the power to make floor 18A move along the continuous loop. The rate of movement is controlled by the speed of electric motor 71. A computer can be programmed to control the speed of electric motor 71 in accordance with a life cycle of any given plant. Electric motor 71 can be fixed to support structure 20. If continuous loop plant growing system 10 is large or experiences drag, more than one electric motor 71 and drive sprocket 62 can be used.

Described herein is continuous loop growing system with the ability to grow plants indoors twenty-four hours a day, seven days a week, three hundred sixty days a year. Produce grown locally and in a controlled environment reduces the risk of contamination from wild animals, bioterrorism attacks, spoilage, transportation, and so on. Rain water can be collected and used with the system and/or ground water can be tested, filtered, and treated prior to use in the system thereby increasing the safety of the plant products produced. Furthermore, the system is environmentally friendly in that it operates on renewable energy and uses local organic soil as the growing medium. The continuous loop growing system provides fresh, nutritious, and flavorful food grown locally all year round.

Although the present invention has been described with reference to preferred embodiments, workers skilled in the art will recognize that changes may be made in form and detail without departing from the spirit and scope of the invention.

The invention claimed is:

1. A growing system comprising:
   a channel having a continuous closed inner side wall, a continuous closed outer side wall, and a continuous moving floor, the channel defining a continuous closed loop dividable into a planting zone, a growing zone, a harvesting zone, and a decomposing zone, the continuous moving floor traveling around the closed loop, wherein the continuous moving floor is formed of a continuous linked series of mating rotatable floor segments that rotatably translate relative to one another such that the moving floor can traverse a curve in the continuous loop, and wherein each rotatable floor segment is adjacent to and mates with two neighboring floor segments; wherein the inner side wall and outer side wall are connected at lower ends to each of the rotatable floor segments and move along with the continuous moving floor around the closed loop;
   a support structure for supporting the channel, the support structure defining a track along which the moving floor moves around the continuous loop;
   a growing medium contained in the channel and moving along with the channel floor;
   at least one plant located in the growing medium and being transported therewith;
   at least one light fixed above the channel for supplying light to the plant as it moves through the growing zone; and
   at least one chopper fixed above the channel for chopping up the plant as it moves through the decomposing zone.

2. The growing system of claim 1, further comprising:
   reflective flaps for reflecting light produced by the light into the channel.

3. The growing system of claim 2, wherein the reflective flaps hang from the light in two rows, a first row hanging into a space between the inner wall and the light and a second row hanging into a space between the outer wall and the light.

4. The growing system of claim 1, wherein a first light is programmed for nurturing a first stage of plant growth and a second light is programmed for nurturing a second stage of plant growth.

5. The growing system of claim 1, wherein the chopper is a rotary type plant chopper having cutting blades for breaking down plant matter.

6. The growing system of claim 1, wherein the light and the chopper are fixed to the support structure.

7. The growing system of claim 1, wherein the support structure has a bumper for providing a lateral guide to the moving floor.

8. The growing system of claim 1, wherein the support structure has legs and cross supports.

9. The growing system of claim 1, further comprising:
a chain having links connected to the continuous moving floor;
a drive sprocket for engaging the chain links causing the continuous moving floor to move along the continuous loop; and
an electric motor for providing power to the drive sprocket.

10. The growing system of claim 9, wherein the electric motor is programmed to run at different speeds depending on the type of plant being transported with the continuous moving floor.

11. A growing apparatus comprising:
a channel defining a continuous loop, the channel being bounded by a continuous moving floor, a continuous closed inner side wall connected at a lower end to and movable with the continuous moving floor, and a continuous closed outer side wall connected at a lower end to and movable with the continuous moving floor, wherein the continuous moving floor is formed of a continuous linked series of mating rotatable floor segments that rotatably translate relative to one another and are each connected to the inner side wall and outer side wall such that the continuous moving floor and the continuous closed inner and outer side walls can traverse a curve in the continuous loop, and wherein each rotatable floor segment is adjacent to and mates with two neighboring floor segments;
a support structure for supporting the channel, the support structure defining a track along which the moving floor moves around the continuous loop;
at least one light fixed above the channel for supplying light; and
at least one chopper fixed above the channel.

12. The growing apparatus of claim 11 wherein the continuous loop is dividable into a planting zone, a growing zone, a harvesting zone, and a decomposing zone.

13. The growing apparatus of claim 11, wherein the light and the chopper are fixed to the support structure.

14. The growing apparatus of claim 11, wherein the support structure has a bumper for providing a lateral guide to the continuous moving floor.

15. The growing apparatus of claim 11, wherein the support structure has legs and cross supports.

16. The growing apparatus of claim 11 further comprising:
a chain having links connected to the segments of the continuous moving floor;
a drive sprocket for engaging the chain links causing the segments of the continuous moving floor to move along the continuous loop; and
an electric motor for providing power to the drive sprocket.

* * * * *